United States Patent
Ancimer et al.

(10) Patent No.: US 6,675,748 B2
(45) Date of Patent: Jan. 13, 2004

(54) METHOD AND APPARATUS FOR FUEL INJECTION INTO AN INTERNAL COMBUSTION ENGINE

(75) Inventors: Richard Ancimer, Vancouver (CA); Konstantin Tanin, Vancouver (CA)

(73) Assignee: Westport Research Inc., Vancouver (CA)

(*) Notice: Subject to any disclaimer, the term of this patent is extended or adjusted under 35 U.S.C. 154(b) by 52 days.

(21) Appl. No.: 10/119,175

(22) Filed: Apr. 9, 2002

(65) Prior Publication Data

US 2002/0166515 A1 Nov. 14, 2002

Related U.S. Application Data

(63) Continuation-in-part of application No. 09/690,503, filed on Oct. 17, 2000, now abandoned, which is a continuation-in-part of application No. 09/503,034, filed on Feb. 11, 2000, now Pat. No. 6,202,601.

(51) Int. Cl.[7] .................................................. F02B 3/00
(52) U.S. Cl. ................................ 123/27 R; 123/27 GE; 123/526; 123/299
(58) Field of Search ..................... 123/27 GE, 525, 123/526, 299, 575, 431, 27 R

(56) References Cited

U.S. PATENT DOCUMENTS

| | | | | |
|---|---|---|---|---|
| 5,119,780 A | 6/1992 | Ariga | .......................... | 123/300 |
| 5,315,973 A | 5/1994 | Hill et al. | .................... | 123/304 |
| 5,329,908 A | 7/1994 | Tarr et al. | .................... | 123/527 |

(List continued on next page.)

FOREIGN PATENT DOCUMENTS

| | | |
|---|---|---|
| DE | 34 42 628 A1 | 5/1986 |
| EP | 0 964 139 A1 | 12/1999 |
| EP | 0 967 372 A2 | 12/1999 |
| WO | WO 96/03578 | 2/1996 |

OTHER PUBLICATIONS

Baker, "Two–State injection reduces diesel cetane requirements", *Automotive Engineering*, vol. 91, No. 5, pp. 35–38, (May, 1983).
Yonetani et al., "Hybrid Combustion Engine With Premixed Gasoline Homogeneous Charge And Ignition By Injected Diesel Fuel—Exhaust Emission Characteristics," *SAE Technical Paper Series 940268*, Feb., 1994.

*Primary Examiner*—John Kwon
(74) *Attorney, Agent, or Firm*—McAndrews, Held & Malloy, Ltd.

(57) ABSTRACT

A method and apparatus for injecting a gaseous fuel into a combustion chamber of an internal combustion engine (ICE) cylinder employs a combination of operating modes. First, one of a low load and a high load mode of operation is selected during the operation of the ICE. Low load and high load modes are distinguished by the combustion characteristics of an amount of fumigated fuel added to the combustion chamber. Fumigated fuel that supports combustion will cause high load to be selected. Fumigated fuel that does not support combustion will cause low load to be selected. A directly injected amount of fuel is provided under low load. Under high load, a directly injected quantity of fuel is added when the piston is near top dead center to allow the engine to meet load requirement above that provided by the fumigated fuel. Under low load, two additional operating regions can be selected, namely, a low speed low load operating mode and a high speed low load operating mode distinguished by a pre-defined engine speed. Under low load low speed mode, fumigated fuel is barred from the combustion chamber. Under high speed low load, the amount of fumigated fuel is determined at a lower end by a pre-defined leakage flow rate. Combustion of either of the directly injected and the fumigated fuel can be initiated by a pilot fuel, which is generally injected directly into the combustion chamber when the piston is near top dead center prior to a power stroke. However, a quantity of pilot fuel can be introduced earlier in the compression stroke or in the intake stroke under high load conditions.

44 Claims, 7 Drawing Sheets

U.S. PATENT DOCUMENTS

| | | | |
|---|---|---|---|
| 5,365,902 A | 11/1994 | Hsu | 123/299 |
| 5,711,270 A | 1/1998 | Pedersen | 123/304 |
| 5,875,743 A | 3/1999 | Dickey | 123/25 |
| 5,890,459 A | 4/1999 | Hedrick et al. | 123/27 |
| 5,979,398 A | 11/1999 | Yanagihara | 123/299 |
| 5,996,558 A | 12/1999 | Ouellette et al. | 123/506 |
| 6,202,601 B1 | 3/2001 | Ouellette et al. | 123/27 |
| 6,286,482 B1 | 9/2001 | Flynn et al. | 123/435 |

METHOD AND APPARATUS FOR FUEL INJECTION INTO AN INTERNAL COMBUSTION ENGINE

CROSS-REFERENCE TO RELATED APPLICATION(S)

This application is a continuation-in-part of U.S. patent application Ser. No. 09/690,503 filed Oct. 17, 2000 now ABN, entitled "Method for Dual Fuel Injection into an Internal Combustion Engine". The '503 application is, in turn, a continuation-in-part of U.S. patent application Ser. No. 09/503,034 filed Feb. 11, 2000, entitled "Method and Apparatus for Dual Fuel Injection Into an Internal Combustion Engine", now U.S. Pat. No. 6,202,601 issued Mar. 20, 2001. Each of the '503 application and the '034 application is incorporated herein by reference in its entirety.

FIELD OF THE INVENTION

The present invention relates to a method for dual fuel injection into the combustion chamber of an internal combustion engine. More specifically, the present invention relates to a dual fuel injection method suitable for application in the internal combustion engine of a car, truck, bus, locomotive, ship or other engine-powered forms of transportation, as well as in stationary applications, such as engines related to energy production and industrial applications.

BACKGROUND OF THE INVENTION

Due to the benefits of converting diesel-stroke engines so that they operate burning gaseous fuels has resulted in many recent developments in this area of engine technology. Many gaseous fuels, such as natural gas or hydrogen, by way of example, are clean burning fuels (relative to diesel), which means that when an engine substitutes such gaseous fuels for diesel fuel, the engine can, depending on a number of variables including the gaseous fuel chosen, operate with reduced emission levels of particulate matter (PM), hydrocarbons and nitrogen oxides ($NO_x$).

A known method that allows diesel engines to operate using gaseous fuels utilizes a second fuel as well as the gaseous fuel. For the purposes of this discussion natural gas will constitute the gaseous fuel, however, other gaseous fuels such as hydrogen, methane, ethane, propane, lighter flammable hydrocarbon derivatives, etc. will also operate as gaseous fuels. Generally, natural gas is mixed with the intake air prior to the introduction of the air/natural gas mixture into the engine cylinder (a process known in the field involved here as fumigation). A homogeneous air/natural gas mixture is thus introduced into the piston cylinder during the intake stroke. During the compression stroke, the pressure and temperature of the homogeneous mixture is increased. Near the end of the compression stroke, a small quantity of pilot diesel fuel is employed to ignite the air/natural gas mixture. The advantage of employing a homogeneous mixture of air and gas is that the combustion fuel to air ratio (F/A ratio) can be controlled so as to burn in a lean homogeneous manner and achieve lower NOx emissions and lower particulate matter, compared to equivalent diesel-fuelled engines.

Note also that the homogeneous mixture of fuel and air can also be ignited by a spark or hot surface. Rather than the ignition of pilot fuel, a spark or hot surface can be employed to cause the homogeneous mixture to ignite, optimally near top dead center at the commencement of the power stroke.

This method of gaseous combustion, namely, employing a fumigated fuel, has a number of disadvantages. The first main disadvantage is encountered at high load engine operating conditions, when the elevated temperature and pressure in the piston cylinder during the compression stroke makes the air/natural gas mixture susceptible to "excessive knocking". Knocking is an uncontrolled combustion process resulting in a very high rate of heat release. Knocking is characterized, in most instances, by relatively rapid fluctuations in combustion chamber pressure. Excessive knocking is associated with conditions where the rapid heat release rate causes excessive combustion chamber pressure that is large enough to damage engine components. Excessive knocking can also cause engine damage through excessive heat release resulting in thermal damage to engine components, such as, by way of example, the piston crown.

A few measures for reducing the risk of excessive knocking include lowering the compression ratio of the engine or limiting the power and torque output, but these measures cause a corresponding reduction in the engine's cycle efficiency (that is, not as much power is available from each piston stroke). A "knock limit" is designated and defined as that set of conditions within the cylinder at which excessive knock can occur as described above. Ultimately, fumigated fuel is knock limited and, as such, is unable to meet load demands beyond a certain level dictated by the knock limit.

For the purposes of this application, "fumigated fuel" or "fumigated gaseous fuel" will be a fuel (generally gaseous) and oxygen mix. Fumigated fuel is a fuel/oxygen mix where the fuel has been mixed with oxygen by the time the piston has reached top dead center immediately prior to both combustion and the piston power stroke. The oxygen would generally be provided as a constituent of intake air; however, it could be provided in some other manner. The fumigated fuel can be mixed with oxygen in the combustion chamber or in the intake manifold (or intake conduit) or partially mixed within both the intake manifold and combustion chamber. For the purposes of this discussion, the fumigated fuel will generally be substantially homogeneous, however, it can also be stratified to some extent.

The second main disadvantage of a homogeneous mixture of fuel and air is that, under low load engine operating conditions, the mixture of fuel and air becomes too lean to support stable combustion via flame propagation and results in incomplete combustion or misfiring. The intake air flow can be throttled to maintain a F/A ratio above a flammability limit, however, such throttling adversely affects the engine efficiency. As will be discussed further below, the flammability limit is defined as the condition limits with the engine under which the F/A ratio will begin to support a flame propagation combustion event.

Third, during start-up it is important that the fumigated fuel, introduced into the cylinder be ignited. However, as is well known in the field involved here, an initial injection of fumigated fuel and, in some cases, a pilot fuel, into the cylinder does not necessarily cause the engine to start on each attempt. When this occurs, a highly flammable mixture can flood the cylinder as well as the exhaust system. This could cause an uncontrolled combustion event when engine ignition is next attempted.

Recently, a different type of dual fuel combustion engine, herein referred to as a high pressure direct injection gas engine, has become known in the field involved here. Similar to the conventional dual fuel method described above, high pressure direct injection gas engines burn a large quantity of gaseous fuel, yielding an improvement over diesel-fuelled engines by reducing the emission levels of $NO_x$ and particulate matter. In addition, high pressure direct injection gas engines have been demonstrated to achieve the same combustion efficiency, power and torque output as state-of-the-art diesel-fuelled engines. The operational principle underlying high pressure direct injection gas engines is that two fuels are injected under pressure into the chamber near the end of the compression stroke. According to one method, a small quantity of "pilot fuel" (typically diesel) is injected into the cylinder immediately followed by a more substantial quantity of gaseous fuel. The pilot fuel readily ignites at the pressure and temperature within the cylinder at the end of the compression stroke, and the combustion of the pilot fuel initiates the combustion of the gaseous fuel that might otherwise be difficult to ignite. Known high pressure direct injection gas engines have no fumigated fuel. As a result, the directly injected gas operates in a "diffusion combustion" mode, rather than a premixed combustion mode. In a diffusion combustion mode typical of homogeneous fuel combustion, the bulk of the combustion is believed to occur in a local near-stoichiometric reaction zone, where the temperature and resulting $NO_x$ formation are relatively high (compared to the temperature and resulting $NO_x$ formation caused by a lean burn premixed combustion).

In U.S. Pat. No. 5,365,902 (hereinafter referred to as the '902 patent), a method and apparatus for dual fuel injection is disclosed, which combines some of the advantages of diffusion combustion and premixed combustion with flame propagation. According to the '902 patent, the engine load conditions are detected, and under low load conditions, the pilot fuel is injected into the cylinder prior to the injection of the gaseous fuel. When the directly injected gaseous fuel is introduced after the pilot fuel is injected, the directly injected gaseous fuel burns in a diffusion mode shortly after entering the combustion chamber. Alternatively, under high load conditions, the gaseous fuel is injected into the combustion chamber prior to the injection of the pilot fuel. In this manner, the gaseous fuel that is injected prior to the introduction of the pilot fuel will mix with air in the combustion chamber, so as to form a homogeneous mixture, which burns by way of flame propagation.

A drawback of the dual fuel injection technique disclosed in the '902 patent is the risk of excessive knocking under high load conditions. As the load is increased, the required fuel to air ratio of the early-injected gaseous fuel is increased. When the F/A ratio is high, there is a risk that compression (and the resulting increase in temperature and pressure) of the early-injected gaseous fuel will cause it to ignite prematurely resulting in excessive knocking. This limit on the quantity of early-injection gaseous fuel is referred to herein as the "knock limit", at or above which, excessive knocking will occur as described above. Because the device disclosed in the '902 patent is knock limited, it can not be employed for engines which target a high power density, nor can it operate as efficiently under high load conditions. As mentioned above, excessive knocking can also cause damage to the engine, reduce engine durability, limit the range of gaseous fuel quality or fuel composition that can be employed, and limit the engine's power output.

U.S. Pat. No. 5,329,908 (hereinafter referred to as the '908 patent) discloses a method of using high pressure direct injection of gaseous fuel. According to the method taught by the '908 patent, gaseous fuel is injected at high pressure, when the piston is at or near top dead center at the end of the compression stroke, thereby providing diesel-like engine cycle efficiencies. When the pressure of the gaseous fuel reservoir drops below about 2,000 pounds per square inch, a controller changes the injection mode, causing the gaseous fuel to be introduced to the cylinder much earlier. For example, the gaseous fuel can be injected during the intake stroke (that is, when air is being drawn into the combustion chamber). In this manner, the gaseous fuel is allowed to mix with the air in the combustion chamber, forming a homogeneous mixture that will burn by supporting flame propagation. The method disclosed in the '908 patent requires a spark or glow plug to ignite the gaseous fuel in the combustion chamber.

The method disclosed in the '908 patent has several disadvantages, however. When operating in its early injection mode (that is, below 2000 pounds per square inch), it is subject to excessive knocking, as discussed above, limiting engine efficiency and power density. Also, under low load conditions, the engine will reach a limit where combustion of the early-injected gaseous fuel does not proceed satisfactorily (poor combustion quality), because the F/A ratio of the mixture is too low (that is, too lean) to support flame propagation. As noted above, this low load limit, resulting from a low F/A ratio, is referred to herein as the "flammability limit". The method disclosed in the '908 patent also relies on a glow plug or spark plug, yielding different combustion characteristics than fuel ignited by pilot diesel. In general, conventional systems that employ glow plugs or spark plugs require a relatively rich air-fuel mixture (compared to ignition by a pilot fuel) to be formed prior to ignition, which results in higher heat release rates and relatively more $NO_x$ formation.

U.S. Pat. No. 5,711,270 (hereinafter referred to as the '270 patent) discloses a technique for high pressure injection of both oil and gaseous-based fuel. The timing and the quantity of gaseous fuel injection is varied when the engine is under different load conditions, and the ignition of the fuel is commenced with the introduction of the oil based fuel (that is, the pilot fuel) into the combustion chamber. The '270 patent discloses one method of implementing the aforementioned high pressure process. Because the '270 patent discloses invariably injecting the pilot fuel first, to initiate combustion, followed by the injection of the gaseous fuel, this method shares the same major disadvantages as other known high pressure direct injection methods, which include invariably burning in a diffusion mode of combustion and not being able to take advantage of a lean premixed combustion, which can yield lower $NO_x$ and particulate matter emissions.

The present fuel injection technique provides an improved method for the injection of fuel into the combustion chamber of an internal combustion engine that avoids the problem noted above.

At the same time, the present fuel injection technique provides a method of mono and dual fuel injection into the combustion chamber of an internal combustion engine which combines the advantages of lean premixed combustion over a range of operational conditions with some of the advantages of diffusion combustion in low and high load operational conditions while avoiding problems associated such a method. These problems arise where limited directly injected fuel is employed and where limited fumigated fuel is employed.

The amount of fumigated fuel is generally controlled by the amount of fuel introduced for fumigation by a variable control valve. During operation, there is some leakage across the variable control valve when the fuel stop valve is open. Therefore, where a flow rate at or below the leakage flow rate is required, control over the fumigation flow can be compromised where that flow is determined by the leakage rate across the variable control valve. While this problem flows from the apparatus generally employed to control fumigation and, therefore, fumigated fuel combustion, it does not generally arise where fumigated fuels alone are employed to drive a piston. That is, stable combustion is difficult to achieve at a fumigation flow rate at or below the leakage flow rate. As will be discussed below, however, this problem is an important consideration if fumigated fuel is employed in conjunction with other combustion techniques such as high pressure direct injection of gaseous fuels.

Moreover, high pressure direct injection requires injector tip heat management as the injector tip is disposed in the combustion chamber. Injector operation can be affected by heat if no fuel or a limited amount of fuel is consistently provided through the injector for an extended number of combustion events. This can occur when combining a second combustion mode to drive the engine pistons.

The present fuel injection technique addresses or manages these concerns associated with combined directly injected fuel and fumigated fuel.

The present fuel injection technique also provides a method of fuel injection into the combustion chamber of an internal combustion engine that compensates for problems known to engines that employ conventional fumigation during start-up or low speed low load conditions when undesirable flammable mixtures are injected into the cylinder and, initially, fail to ignite.

The present fuel injection technique further provides a set of operating parameters for fuel injection into the combustion chamber of an internal combustion engine which avoids excessive knock associated with high load conditions as seen in prior art noted above.

SUMMARY OF THE INVENTION

The present method and apparatus overcome the shortcomings noted above by introducing fuel into a combustion chamber of an internal combustion engine having at least one cylinder with a piston. The cylinder and piston partially defining the combustion chamber where the piston oscillates within the cylinder between top dead center and bottom dead center when the internal combustion engine is operating. The method comprises selecting either a low load operating mode or a high load operating mode. The operating modes are distinguished by the combustion characteristics of a fumigated gaseous fuel within the combustion chamber. The low load operating mode is defined where the fumigated gaseous fuel is unable to support stable premixed combustion. The high load operating mode is defined where the fumigated gaseous fuel is able to support stable premixed combustion. In the high load operating mode, the fumigated gaseous fuel is introduced into the combustion chamber before the piston is at top dead center. In the low load operating mode, if fumigated gaseous fuel is introduced, realizing that some may not be introduced during start-up, providing that fumigated gaseous fuel into the combustion chamber before the piston is at top dead center. In the low load operating mode, a quantity of a second gaseous fuel is directly injecting into the combustion chamber when the piston is at or near top dead center. The fumigated gaseous fuel and the second gaseous fuel are ignited within the combustion chamber when the piston is at or near top dead center.

A further embodiment of the present method and apparatus includes, in the high load operating mode, directly injecting a quantity of the second gaseous fuel into the combustion chamber when the piston is at or near top dead center. The second gaseous fuel and the fuel in the fumigated fuel can be the same.

In the high load operating mode, the fumigated gaseous fuel can be ignited by way of homogeneous charge compression ignition.

Also, the second gaseous fuel can be ignited as a result of ignition of a pilot fuel that is more auto-ignitable than the second gaseous fuel. In the high load operating mode, ignition of the fumigated gaseous fuel can be as a result of ignition of a pilot fuel that is more auto-ignitable than the fumigated gaseous fuel. In either case the pilot fuel can be directly injected into the combustion chamber.

In the low load operating mode, the pilot fuel is directly injected into the combustion chamber when the piston is at or near top dead center. In the high load operating mode, the pilot fuel can be directly injected into the combustion chamber during an intake stroke or compression stroke of the piston or when the piston is at or near bottom dead center. A preferred embodiment has injection effected between 120 and 60 degrees prior to top dead center as measured in degrees of crankshaft rotation. The pilot fuel can also be injected in two stages, a first stage during an intake stroke or compression stroke of the piston or when the piston is near bottom dead center or when the piston is between 120 and 60 degrees prior to top dead center as measured in degrees of crankshaft rotation. A second stage injection of pilot fuel is included when the piston is at or near top dead center prior to or at the commencement of the power stroke.

A further embodiment the method includes igniting the fumigated gaseous fuel and the second gaseous fuel by way of a hot surface, including a glow plug, or a spark.

A further embodiment includes in the low load operating mode, employing a low speed low load operating mode and a high speed low load operating mode. The low speed low load operating mode defined by an engine speed range, as measured in crankshaft revolutions per minute (RPM), from and including zero up to a pre-defined operating speed. The high speed low load operating mode is defined by an engine speed at or above the pre-defined operating speed. In the low speed low load operating mode, barring the fuel in the fumigated gaseous fuel from the combustion chamber thereby eliminating fumigated fuel from the combustion chamber. In the high speed low load operating mode, a flow of the fuel in the fumigated gaseous fuel is provided in excess of a pre-defined leakage flow rate.

In the above embodiment, the flow of the fuel in the fumigated gaseous fuel is regulated by at least one of a shut-off valve and a variable control valve. Each of these components is disposed within a fuel passage defined by a fuel conduit. The fuel passage is in communication with an intake passage defined by an intake conduit such that the fuel passage and the intake passage direct the fuel in the fumigated gaseous fuel into the combustion chamber during an intake stroke.

A further embodiment includes the method where the shut-off valve is closed in the low speed low load operating mode prohibiting the fuel in the fumigated gaseous fuel from entering the combustion chamber.

The fuel in the fumigated gaseous fuel can also be directly injected into the combustion chamber and, therefore, substantially mixed with oxygen in the combustion chamber.

The method includes a fumigated gaseous fuel at a quantity at or below a pre-defined knock limit when the high load operating mode is employed. The quantity of the second gaseous fuel can be zero or a pre-defined injector tip maintenance limit when combustion of the fumigated gaseous fuel meets engine load requirements. If load is not met by fumigated gaseous fuel combustion, the quantity of the second gaseous fuel is determined by engine load requirements beyond that met by combustion of the fumigated gaseous fuel.

An apparatus is also disclosed that introduces fuel into a combustion chamber of an internal combustion engine having at least one cylinder with a piston, the cylinder and the piston partially defining the combustion chamber. The apparatus includes measuring devices for collecting operational data from the engine such as engine speed, engine load demand and excessive knock information. A controller is also included that is capable of processing the operational data to create an engine profile, and, with that information, directing the engine to operate in one of a low load operating mode and a high load operating mode based on the engine profile. The low load operating mode and the high load operating mode are distinguished by combustion characteristics of a fumigated gaseous fuel within the combustion chamber. In the low load operating mode the fumigated gaseous fuel is unable to support stable premixed combustion. In the high load operating mode the fumigated gaseous fuel is able to support stable premixed combustion. The apparatus further includes a main fuel injector capable of directly injecting a second gaseous fuel into the combustion chamber. A pilot fuel injector is provided that is capable of injecting a pilot fuel into the combustion chamber. The pilot fuel is more auto-ignitable than the fumigated gaseous fuel or the second gaseous fuel. Finally, an intake conduit is provided for directing the fumigated gaseous fuel into the combustion chamber. In the low load operating mode, the control unit then directs, if fumigated gaseous fuel is to be provided, the fumigated gaseous fuel through the intake conduit making it available within the combustion chamber before the piston is at top dead center. The main fuel injector is directed, in the same operating mode, to introduce the second gaseous fuel into the combustion chamber when the piston is at or near top dead center. Finally, in the low load operating mode, the pilot fuel injector introduces the pilot fuel into the combustion chamber when the piston is at or near top dead center. In the high load operating mode, the control unit directs the fumigated gaseous fuel through the intake conduit to be available in the combustion chamber when the piston is at or near top dead center. The fumigated fuel in this mode falls below a pre-defined knock limit. The pilot fuel injector introduces pilot fuel into the combustion chamber during the compression stoke of the engine when operating.

The apparatus control unit can further direct the main fuel injector to introduce the second gaseous fuel into the combustion chamber when the piston is at or near top dead center.

Finally, the control unit in the apparatus, in the low load operating mode, can direct the engine to operate in either a low speed low load operating mode or a high speed low load operating mode based on the engine profile. The low load operating modes are distinguished by engine speed as measured in crankshaft revolutions per minute (RPM). In low speed low load operating mode the engine speed range is from and including zero up to a pre-defined operating speed. In the high speed low load operating mode, the engine speed is at or above the same pre-defined operating speed. In low speed low load operating mode, the control unit prohibits the fumigated gaseous fuel from the combustion chamber. In the high speed low load operating mode, the control unit directs the fuel in the fumigated gaseous fuel through to the intake conduit in a quantity in excess of a pre-defined leakage flow rate.

The present fuel injection technique provides a method of mono- and dual-fuel injection into the combustion chamber of an internal combustion engine, which combines the advantages of lean fumigated fuel combustion over a range of operational conditions with some of the advantages of diffusion combustion in low and high load operational conditions.

The present fuel injection technique provides for a fuel injection strategy that provides more reliable start-up and, at the same time, is able to operate taking advantage of fumigated fuel combustion characteristics once the engine is started and operating under load.

The present fuel injection technique provides a set of operating parameters for fuel injection into the combustion chamber of an internal combustion engine, which utilizes fumigated fuel to benefit from lean burn homogeneous combustion under higher loads of operation while avoiding excessive knock associated with high load conditions.

The present fuel injection technique provides a method of fuel injection into the combustion chamber of an internal combustion engine, which retains the high efficiency and high cycle output of high pressure direct injection, retains the advantage of lower $NO_x$ and particulate matter emissions normally associated with lean burn combustion of fumigated fuel, and helps maximize power density while avoiding excessive knocking.

The present fuel injection technique finally provides a method of introducing fuel into a combustion chamber of an operating internal combustion engine having at least one cylinder with a piston, said engine having a low load mode of operation and a high load mode of operation, and wherein said fuel comprises a main fuel and a pilot fuel that is more auto-ignitable than said main fuel, said method comprising:

(a) detecting a set of load conditions on said engine; and (b) employing said low load operating mode when a first predetermined set of load conditions is detected, said first predetermined set of load conditions corresponding to load conditions that exist when the desired ratio of said main fuel to air is less than a calibrated premixed combustion stability limit of a homogeneous mixture of said main fuel and intake air, and employing said high load operating mode when a second predetermined set of load conditions is detected, wherein at an operating engine speed as measured in the form of crankshaft revolutions per minute, said second set of load conditions corresponds to an engine load that is greater than the engine load corresponding to said first predetermined set of load conditions.

BRIEF DESCRIPTION OF THE DRAWINGS

In FIG. 1, the horizontal axis represents engine speed, the vertical axis represents load conditions (which can be equated to the fuel to air ratio, a variable that directly correlates with load conditions) and line C represents the premixed combustion stability limit, which separates the two different operating modes. Line M represents the maximum load limit for the engine. Area P represents the initial start-up or low speed low load conditions utilizing high pressure direct injection while area L shows a low load condition for a preferable mode of operation beyond a predetermined engine speed where line O defines the engine speed at which transition between these modes occurs. This second low load operating mode is high speed low load mode. Region H represents high load operating mode.

FIG. 3a depicts a gaseous fuel being injected into the combustion chamber via the intake inlet introduced during the intake stroke along with a quantity of air.

FIG. 3b depicts the injection of a quantity of pilot fuel and a directly injected quantity of gaseous fuel into the cylinder when the piston is at or near top dead center, prior to or upon commencement of the power stroke.

FIG. 4, which comprises

FIG. 4a depicts a fumigated gaseous fuel being injected into the combustion chamber through the intake valve during the intake stroke, and FIG. 4b depicts the injection of a pilot fuel during the early stages of the compression stroke, and FIG. 4c shows a final direct injection of gaseous fuel near top dead center just prior to or at the commencement of the power stroke.

FIG. 5, which comprises

FIG. 5a depicts a fumigated gaseous fuel being injected into the combustion chamber through the intake valve during the intake stroke, and FIG. 5b depicts the injection of a pilot fuel and gaseous fuel when the piston is at or near top dead center.

FIG. 6, which comprises

FIG. 6a depicts a fumigated gaseous fuel being injected into the combustion chamber through the intake valve during the intake stroke.

FIG. 6b depicts the injection of a first amount of pilot fuel during the early stages of the compression stroke.

FIG. 6c shows the injection of a second amount of pilot fuel and a direct injection of gaseous fuel introduced when the piston is at or near top dead center.

DETAILED DESCRIPTION OF PREFERRED EMBODIMENT(S)

In the present method, fuel is injected into the combustion chamber of an internal combustion engine having at least one reciprocating piston and a crankshaft associated with the piston. The method generally involves two fuels, one of which is a pilot fuel, which auto-ignites more readily than the gaseous fuel. However, the method, generally, can also utilize ignition sources other than pilot fuel such as a hot surface ignition source such as a glow plug. The focus of the method, most generally, is on the premixed combustion stability limit and the engine speed under low load conditions. Nevertheless, the gaseous fuel, in the case of a dual fuel strategy, or, simply the fuel in the case of mono (single) fuel operation, is preferably a gaseous fuel such as, for example, natural gas, other gaseous hydrocarbons, or hydrogen gas. In dual fuel operation, the pilot fuel can be a liquid hydrocarbon fuel or a blend of liquid fuels, but in preferred embodiments, the pilot fuel is conventional diesel fuel or dimethylether.

According to the present method, the load conditions of the engine are monitored and certain conditions are defined where different operating modes are triggered. For example, the introduction of fuel into the combustion chamber of an operating engine can be controlled differently in a low load operating mode compared to a high load operating mode.

Figure 1:
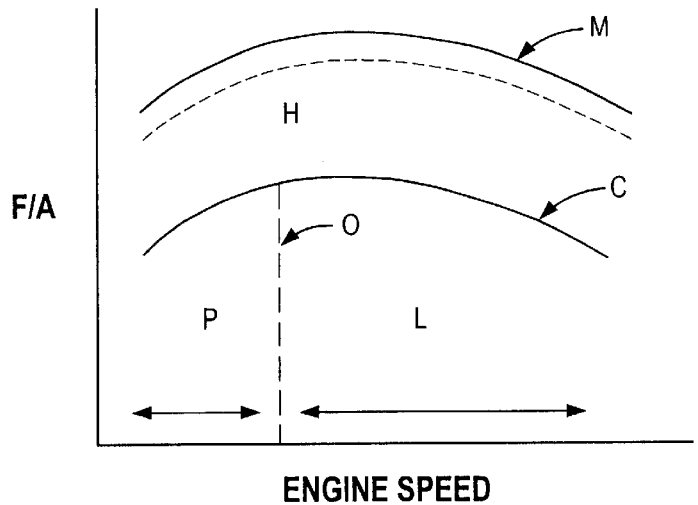
FIG. 1 shows an illustrative plot of how load conditions can be employed to define a plurality of operating modes and the interaction between these operating modes.

The present method contemplates two operating modes, each of which can employ at least one operating parameter. FIG. 1 is a plot of engine load against engine speed. Engine speed can be measured, for example, by measuring the speed of crankshaft rotation in rotations per minute (RPM). Engine load, measured on the vertical axis correlates to overall fuel to air ratio. FIG. 1 graphically illustrates two regions divided by line C determined by the "premixed combustion stability limit" of the fuel at a given fuel to air ratio. The premixed combustion stability limit is defined as the quantity of fuel mixed with oxygen, that is, fumigated fuel, resulting in a fuel to air ratio (F/A) at which the quantity of fumigated gaseous fuel within the piston cylinder will not support stable premixed combustion in combustion mode. For example, premixed combustion is defined by either flame propagation or homogeneous charge compression ignition combustion, whereby combustion of the fumigated fuel occurs at many points substantially simultaneously throughout the combustion chamber with substantially no flame propagation. Homogeneous charge compression ignition is thought to be controlled primarily by chemical kinetics, with turbulence inside the combustion chamber having no significant influence on this mode of combustion. Therefore, the premixed combustion stability limit is distinguished from a flammability limit, in that the flammability limit is defined as the quantity of gaseous fuel within the piston cylinder resulting in a F/A ratio that will not support a flame propagation mode of combustion. Accordingly, since premixed combustion can operate with a fuel mixture that is too lean to support flame propagation, the load or F/A ratio associated with the premixed combustion stability limit is lower than the load or F/A ratio associated with the flammability limit. That is, by using the premixed combustion stability limit as the upper limit for low load operating region L, the extent of this region is reduced compared to the case where the flammability limit is employed as the upper limit for region L, namely, because such stable combustion incorporates more than just flame propagation combustion, namely homogeneous charge combustion. Therefore, an advantage of using the premixed combustion stability limit as the upper limit for low load operating region L, is that the extent of high load operating region H is increased.

In a preferred embodiment, there are three operating modes that correspond to predefined low and high load conditions. These operating modes are illustrated graphically in FIG. 1. The horizontal axis represents engine speed (that is, crankshaft rotation), measured in revolutions per minute (RPM), and the vertical axis, indicates fuel to air ratio, which is a parameter that correlates to the load on the engine. The fuel to air ratio increases with engine load for a fixed engine speed. The low load region is represented by two operating regions, a low speed low load operating region P and a high speed low load operating region L. Region H represents an area corresponding to high load conditions. Focusing on the low load mode, that is where the engine load requires a fuel to air ratio that is below the premixed combustion stability limit (line C), this operating area generally corresponds to a set of load conditions under which a low load operating mode is employed. FIG. 1 shows that the low load operating mode is split into two operating modes according to engine speed at a given low load condition. Therefore, the current technique optimizes a set of operational modes triggered both by engine speed and load.

Region P is referred to herein as a low speed low load operating mode. This operating mode will, generally, include start-up conditions of the engine. It can also be desirable to operate in this mode at a low engine speed under low load conditions should such a situation arise, such as, an idle mode necessary for engine operation over an extended period of time. This mode is distinguished, as will be discussed below, by the fact that it is driven by directly injected fuel that burns in a diffusion mode.

Likewise, region L will be referred to herein as a high speed low load operating mode. This mode of operation includes a range of engine speeds under low load conditions. It is dictated, as will be discussed below, by a minimum amount of fumigated fuel within the cylinder just prior to start of combustion. This amount is generally set by the valve leakage rate. However, its range is determined by an amount of fumigated fuel that falls below a fuel to air ratio, also known as the equivalence ratio for the fumigated fuel, that would support independent combustion of this fumigated fuel, or, put another way, homogeneous combustion or propagation combustion of this fumigated fuel. Region L can be seen as an operating mode wherein the engine operates under idle conditions. However, for reasons that will be mentioned below, it is preferable to transition back down into region P if there is a wish to idle for an extended period of time.

The plots depicted in FIG. 1 show only the general shape of predefined regions that correspond to different operating modes. Persons skilled in the technology involved here will understand that the actual numerical values for RPM and load or fuel to air ratio depend upon the individual characteristics of a particular engine design (for example, the size of the cylinder bore, the length of the stroke, the compression ratio, the shape of the combustion chamber, or the type of fuel). That is, engines of different design can have different regional boundaries between operating modes. The numerical values and the shape of the boundary line for a specific engine supplied with specific fuels can be determined empirically or theoretically.

FIGS. 2, 3, 4 and 6 illustrate the preferred three modes of operating using the disclosed method. Throughout the description, the preferred method of operation contemplates dual fuel operation. However, the dual-fuel injection strategy can be adapted to mono-fuel operation. That is, the disclosure can be adapted to a strategy utilizing hot surface or spark ignited combustion. Where reference is made to pilot fuel injection, this can be substituted with glow plug or spark ignition timing that is adjusted to provide an ignition source with the same effect as that provided by the pilot fuel combustion timing. Also, combustion can be driven by homogeneous charge compression ignition of the fumigated fuel or self-ignition of the directly injected quantity of fuel, in either case, when the piston is at or near top dead center.

Figure 2:
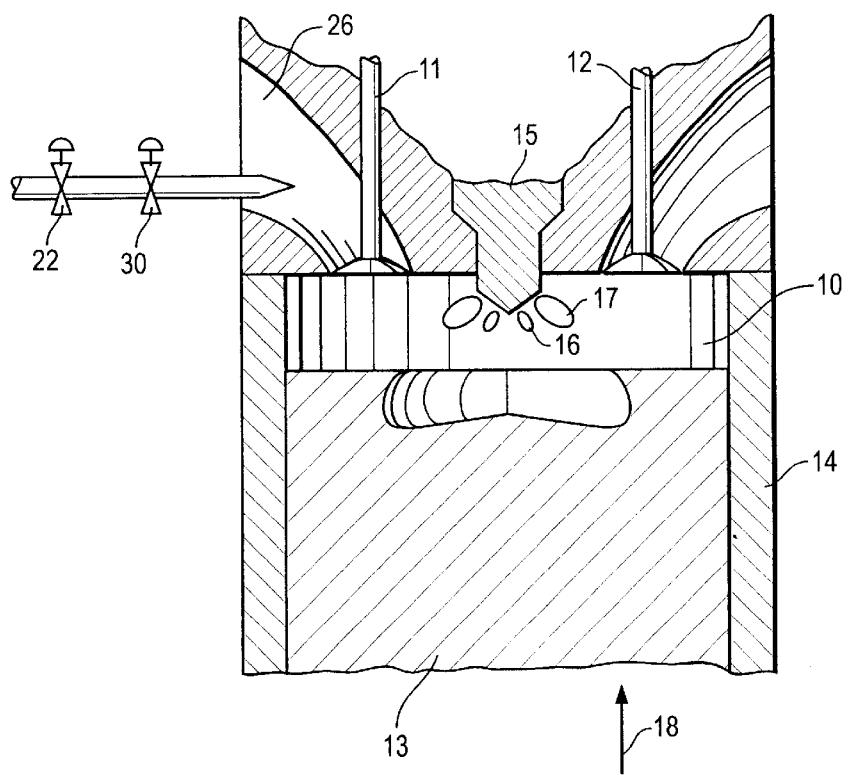
FIG. 2 is a partial cross section view of an engine combustion chamber that shows pilot fuel and a gaseous fuel, both being injected into the combustion chamber when the piston is at or near top dead center FIG. 3, which comprises

FIG. 2 shows the preferred initial mode of operation under low load conditions, namely, during low speed low load.

Initially, during low speed low load, intake valve 11 and exhaust valve 12 are closed as shown in FIG. 2. Piston 13 is at or near top dead center in piston cylinder 14 completing or having just completed the compression stroke, the direction of which is indicated by arrow 18. Also, fuel shut-off valve 22 is closed preventing fuel from entering the cylinder through the intake valve during the intake stroke, thus preventing fumigated fuel from entering into the combustion chamber in this embodiment. At this time, the power stroke is initiated by the introduction of pilot fuel 16 through injector 15. Since there is an "ignition delay" between the introduction of pilot fuel 16 and actual ignition and combustion, pilot fuel 16 is preferably introduced before piston 13 reaches top dead center such that the actual ignition of the pilot fuel will occur when the piston is near top dead center. Pilot fuel 16 can be introduced between fifty degrees before top dead center and twenty degrees after top dead center (measured by degrees of crankshaft rotation). The actual timing within this range can be set with consideration to measured operating parameters such as engine speed. For example, as engine speed increases, pilot fuel 16 can be introduced into combustion chamber 10 earlier in the engine cycle so that combustion after the ignition delay will substantially coincide with when piston 13 is at or near top dead center.

Gaseous fuel 17 is preferably introduced into combustion chamber 10 sequentially, that is, after the introduction of pilot fuel 16. However, as shown in FIG. 2, pilot fuel 16 and gaseous fuel 17 can also be introduced simultaneously, for example, by commencing pilot and gaseous fuel introduction simultaneously, or by overlapping fuel introduction (that is, introducing pilot fuel 16 first, but then introducing gaseous fuel 17 while pilot fuel 16 is still being injected). Whether or not there is an overlap can depend, for example, upon engine speed and/or the quantity of fuel to satisfy the engine load. For example, as engine speed and the quantity of fuel increase, there can be more of an overlap.

According to this low load method, gaseous fuel 17 is not well mixed with the intake air and gaseous fuel 17 burns in a diffusion mode. In the low load operating mode, less mixing is desirable to improve combustibility since the overall fuel to air ratio is below the premixed combustion stability limit. Accordingly, in this mode, gaseous fuel 17 is more concentrated and ignitable near the injector where pilot fuel is burning. Unlike conventional methods that introduce gaseous fuel with the intake air, there is no need to restrict the quantity of air that is drawn into the combustion chamber to ensure the combustibility of the fuel. Consequently, in this embodiment when this disclosed low load operating mode is employed, there are no parasitic pressure losses caused by restricting the flow through the air intake.

Moreover, this mode of operation provides other advantages during low speed low load. Low speed low load is more consistent and better controlled when gaseous fuel is directly injected at high pressures in comparison to fumigated fuel low speed low load. Fumigated fuel where the fuel is natural gas is relatively difficult to ignite. Many of the variables associated with a fumigated gaseous fuel under low speed low load mode, such as a reduction in the level of air introduced into the cylinder, are also eliminated.

Like a conventional direct injection engine, compression of the intake air raises its temperature such that at the end of the compression stroke, the pressure and temperature within combustion chamber 10 is sufficient to ignite pilot fuel 16 after it is introduced (that is, after the ignition delay). The ignition of pilot fuel 16 ensures the ignition of gaseous fuel 17. The quantities of pilot fuel 16 and gaseous fuel 17 introduced in this region of the low load operating mode can be adjusted depending upon the calculated total fuel requirement which is determined from the detected load conditions on the engine operating at a particular speed.

Figure 3A:
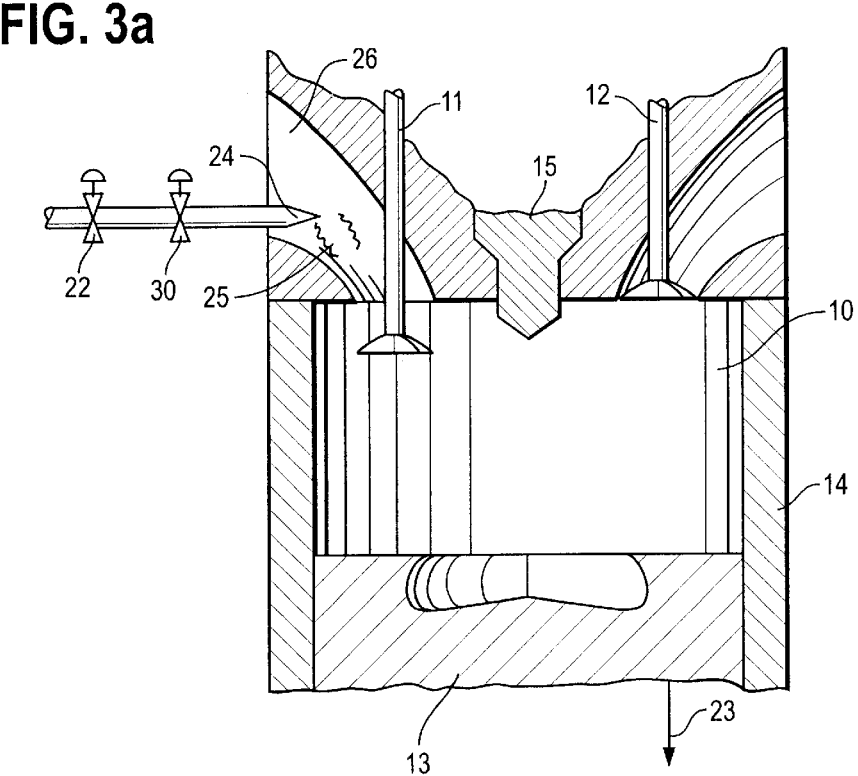
FIGS. 3a and 3b, depicts partial cross section views of an engine combustion chamber, showing a second mode of operation under low load conditions, preferably employed after engine speed exceeds a pre-determined value. This mode of operation shows the sequential injection of fuel into the combustion chamber during three stages or events.

Referring to FIG. 3a, as low speed low load stabilizes and as engine speed increases beyond a given speed, represented, for example, in FIG. 1 as line O, fuel shut off valve 22 is opened. At this point a fuel at least partially fumigated in the intake valve is introduced into the cylinder along with the directly injected gaseous fuel and pilot fuel.

In FIG. 3a, piston 13 is moving away from top dead center in the direction of arrow 23. Fuel 24 is introduced into intake manifold 26 through open fuel shutoff valve 22. Quantity is controlled by variable control valve 30. During this stage of the intake stroke, gaseous fuel 24 mixes with air within intake manifold 26 whereby fumigated fuel 25 is introduced into cylinder 10 through intake valve 11.

Figure 3B:
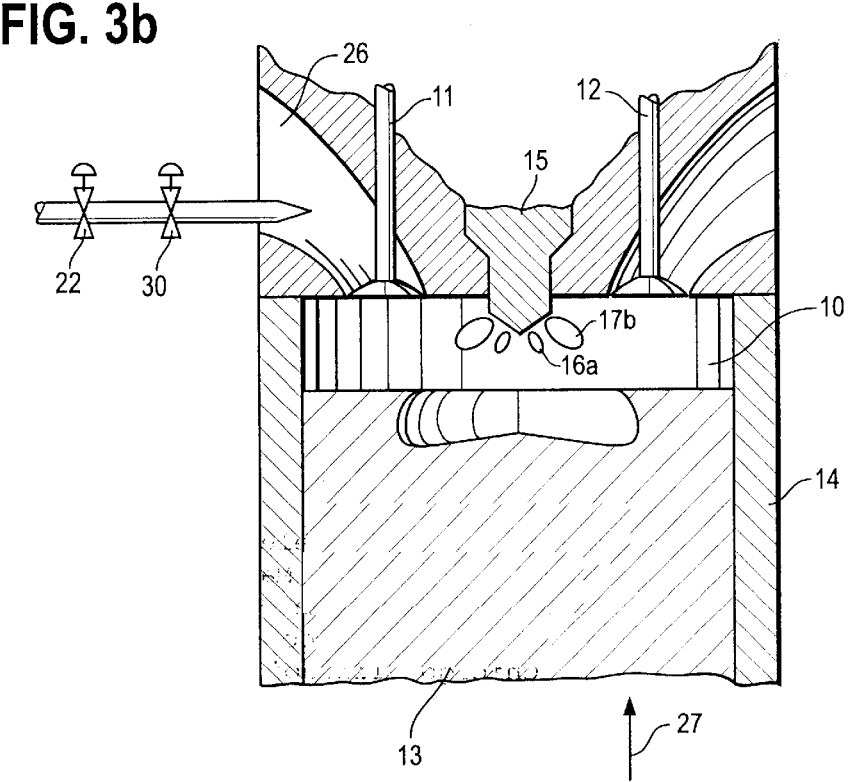

Referring to FIG. 3b piston 13 is completing a compression stroke moving in the direction of arrow 27. The piston is positioned near top dead center. Intake valve 11 and exhaust valve 12 are closed. At this point, pilot fuel 16a is introduced and gaseous fuel 17a is introduced with much the same timing as noted above with reference to FIG. 2 and the low speed low load mode of operation. Therefore, as noted above, pilot fuel 16a can be introduced followed sequentially by an introduction of directly injected gaseous fuel 17a or the introduction of the two fuels can overlap.

The equivalence ratio of fumigated gaseous fuel 24 introduced during the intake stroke is generally set by the leakage flow rate of the variable control valve. By way of example, a leakage flow rate can be 10 kg/hr per valve but can vary depending on the variable control valve, fumigation system and other factors. A flow of fuel to be fumigated below a valve's minimum rated flow, is dictated by the leakage flow rate. As the leakage flow rate behavior is variable, control over fumigated gaseous fuel is compromised. Therefore, variable control valve 30 is generally set slightly above the leakage flow rate when fumigated fuel 24 is introduced.

In operation, during this second mode of operation, the power stroke is, for the most part, driven almost exclusively by the directly injected gaseous fuel. The engine is operating below the premixed combustion stability limit. Therefore, the nominal fumigated fuel introduced during the intake stroke cannot support a homogeneous or propagation combustion event. It is thought that only that portion of the fumigated fuel that approaches the diffusion flame, via advection or otherwise, will actually burn.

Note, as would be understood by persons skilled in the technology involved, both the shut-off valve and the variable control valve can be replaced by an injector that directly injects gaseous fuel into the intake path.

FIGS. 4, 5 and 6 illustrate modes of operation where engine load conditions have exceeded premixed combustion stability limit noted as line C on FIG. 1. That is, these figures demonstrate an engine operating mode under high load conditions where the power stroke of the piston is driven by at least two distinct combustion events, namely, diffusion and propagation or homogeneous compression charge combustion. Each mode of operation generally considers injection of pilot and gaseous fuel in three separate events that includes some fumigated fuel into the combustion cylinder.

Figure 4A:
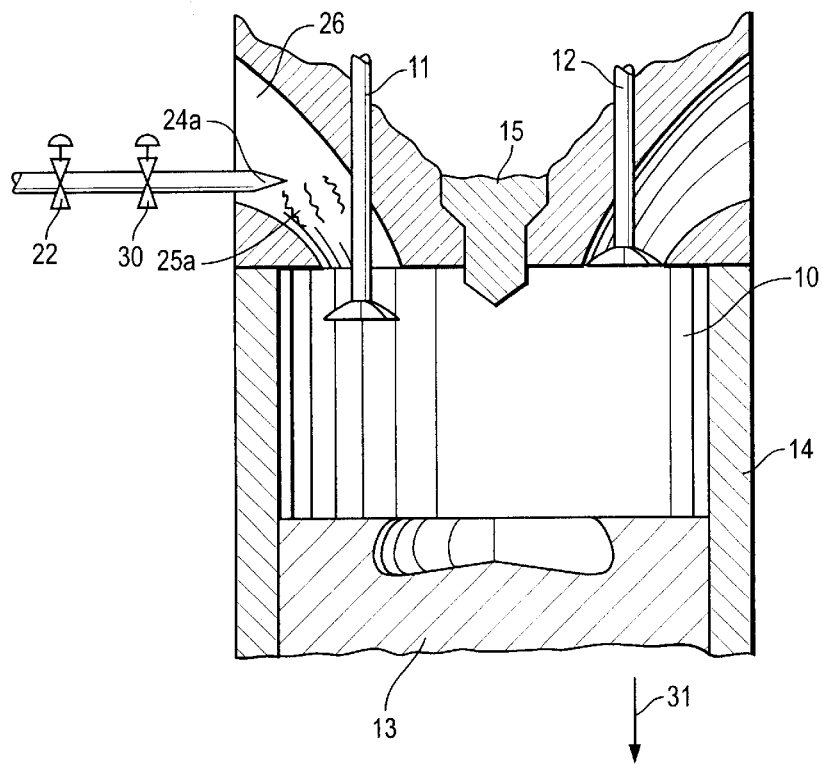
FIGS. 4a, 4b and 4c, depicts partial cross section views of an engine combustion chamber, showing the sequential injection of fuel into the combustion chamber under a preferred set of high load conditions.
Figure 4B:
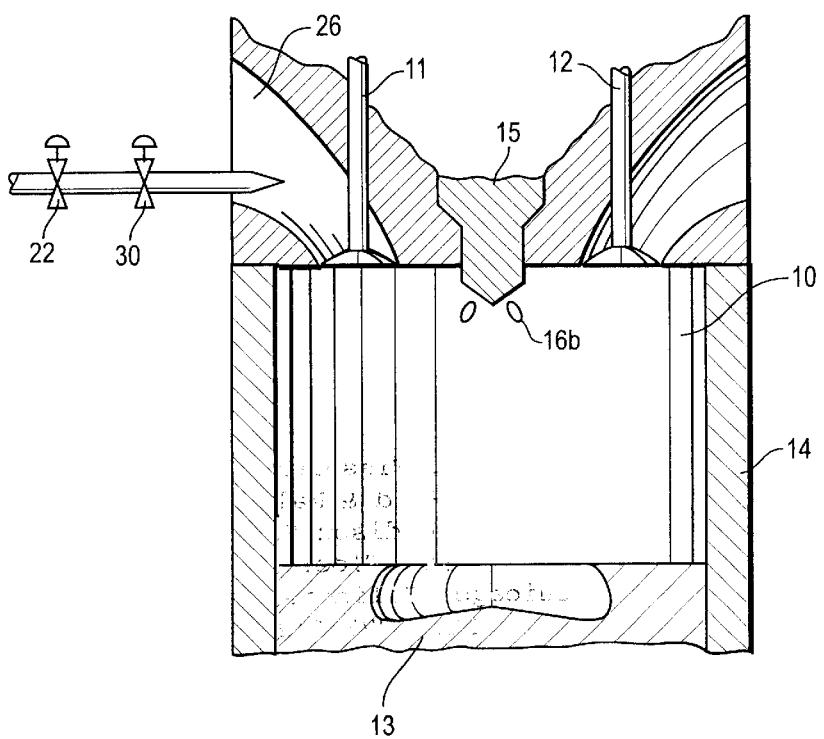
Figure 4C:
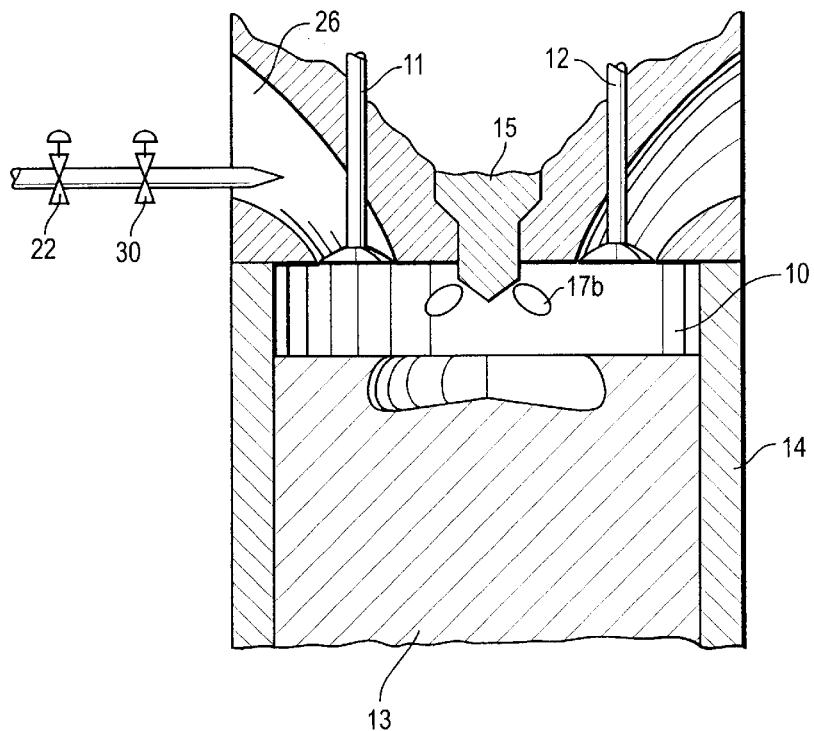

FIG. 4, which comprises FIGS. 4a, 4b and 4c, shows a preferred method of operating above the premixed combustion stability limit. Generally, in the preferred method of operating under high load condition, the first of the three events, shown in FIG. 4a, introduces a fumigated fuel into the cylinder during the intake stroke when the piston is moving in the direction of arrow 31. That is, variable control valve 30 is regulated to allow for a desired amount of gaseous fuel 24a into intake manifold 26. The gaseous fuel mixes with the intake air and fumigated fuel 25a is drawn into the cylinder by the action of the intake stroke. Further mixing of fumigated fuel 25a can take place within the cylinder.

Next, referring to FIG. 4b, a quantity of pilot fuel is introduced. This quantity can be introduced during the intake or compression stroke. In this preferential mode, pilot fuel 16b can be introduced at the completion of the intake stroke, however, it is preferably introduced during the compression stroke. Most preferably, pilot fuel 16b is introduced between 120 and 60 degrees prior to top dead center, measured by crankshaft rotation angle, thus balancing:

(a) control of the start of combustion of the pilot fuel, where this is best achieved with an injection near top dead center; and, (b) greater opportunity for pilot fuel homogeneity with intake air found within the cylinder, which is best achieved with an injection well prior to the piston reaching top dead center.

Introducing the pilot fuel well prior to top dead center allows the pilot fuel to mix with intake air, at least partially, and potentially substantially, within the cylinder and, as such, burn cleaner with a reduction in $NO_x$ emissions and particulate emissions once it does ignite.

Referring to FIG. 4c, following the provision of fumigated fuel and the pilot fuel injection, a direct injection of gaseous fuel 17b into the cylinder commences when the piston is near top dead center, during or just prior to the commencement of the power stroke.

In the aggregate, the energy available from fumigated gaseous fuel 25a is dictated by the knock limit of the fumigated fuel within cylinder 10 under the load condition experienced at a particular point in time. That is, for a given set of high load conditions, the equivalence ratio of the initial injection of gaseous fuel during the intake stroke is preferably near the knock limit for that amount of fumigated fuel thereby maximizing the amount of power provided by combustion of fumigated fuel 25a without excessive knocking of the fumigated fuel.

Under high load conditions, further load requirements beyond that provided by the knock limited premixed combustion can be met by an increased supply of directly injected gaseous fuel 17b: see FIG. 4c. This gaseous fuel, as discussed, is injected near top dead center and burns in a diffusion mode. Emission penalties result from employing a diffusion mode of combustion. However, these penalties are offset by the fact that direct injection allows the engine to meet much higher load demands than would otherwise be the case. An important strategy for this method is to provide as much fumigated fuel 25a as possible without introducing excessive knocking thus limiting emissions, namely, $NO_x$ and particulate emissions, over a broad range of operating conditions.

Put another way, because gaseous fuel 17b is injected near top dead center at the end of the compression stroke or during the power stroke, it does not have an opportunity to thoroughly mix with the air in combustion chamber 10. Accordingly, this gaseous fuel 17b burns, substantially, in a diffusion mode of combustion. Since the quantity of fumigated fuel that can be introduced when the piston is near top dead center is knock limited, engine power output beyond a certain point, usually determined by this knock limit, is preferentially controlled by adjusting the quantity of gaseous fuel 17b introduced directly as shown in FIG. 4c. That is, premixed combustion will serve high load conditions only up to the knock limit of fumigated fuel 25a.

When gaseous fuel 17b and 24a is a fuel such as natural gas or hydrogen, and pilot fuel 16a is diesel fuel, introducing an additional charge of gaseous fuel 17b when the piston is near top dead center increases the proportion of gaseous fuel that can be employed to satisfy engine requirements under high load conditions. In a preferred embodiment of the high load operating mode, the quantity of pilot fuel 16b represents about 1–15% of the total quantity of fuel on an energy basis, with gaseous fuel 17b and 24a providing the balance.

Accordingly, the disclosed method of introducing gaseous fuel and pilot fuel in three separate events during high load conditions reduces the likelihood of excessive knocking, provides efficient operation by utilizing both a lean premixed combustion and a diffusion mode of combustion that increases the range of engine operation compared to methods employing premixed combustion alone. An advantage of using the premixed combustion stability limit as the lower limit for high load operation (see FIG. 1, line C) is that this allows the engine to benefit from more lean burn homogeneous combustion (and reduced emissions) compared to the case when the flammability limit is employed as this lower limit. This method also maintains high engine power output while reducing $NO_x$ and particulate matter emissions compared to conventional methods of operation.

Note also, as mentioned above, this high load method of operation can, under less demanding high load conditions, meet some power requirements by significantly reducing or, in some cases, completely eliminating the directly injected gaseous fuel. That is, if power demands can be met with fumigated gaseous fuel 25a alone, emissions can be further reduced by this reduction in the quantity of fuel directly injected. Such a reduced high load operating environment would be bounded by the knock limit such that fumigated gaseous fuel could meet power requirements at an equivalence ratio below the knock limit. Within this operating mode, the quantity of gaseous fuel 24a and fumigated fuel 25a introduced into combustion chamber 10 can be adjusted in response to engine load. However, once the knock limit is reached, the equivalence ratio of the fumigated gaseous fuel is generally constant and power requirements are then met by variations in the quantity of directly injected gaseous fuel 17b.

Care should be taken when operating with reduced or eliminated directly injected gaseous fuel, however. A direct injection of gaseous fuel helps to manage overheating of the injector tip. So long as an injector tip is provided within the cylinder to service higher loads of operation, heating of the tip, depending on tip design, can advantageously be monitored. Overheating of the injector tip, which can result when the injector is introducing pilot fuel injection alone, could affect performance of the injector and, consequently, engine performance. As such, it is desirable to maintain some direct injection of gaseous fuel at or beyond a predefined injector tip maintenance limit.

Figure 5A:
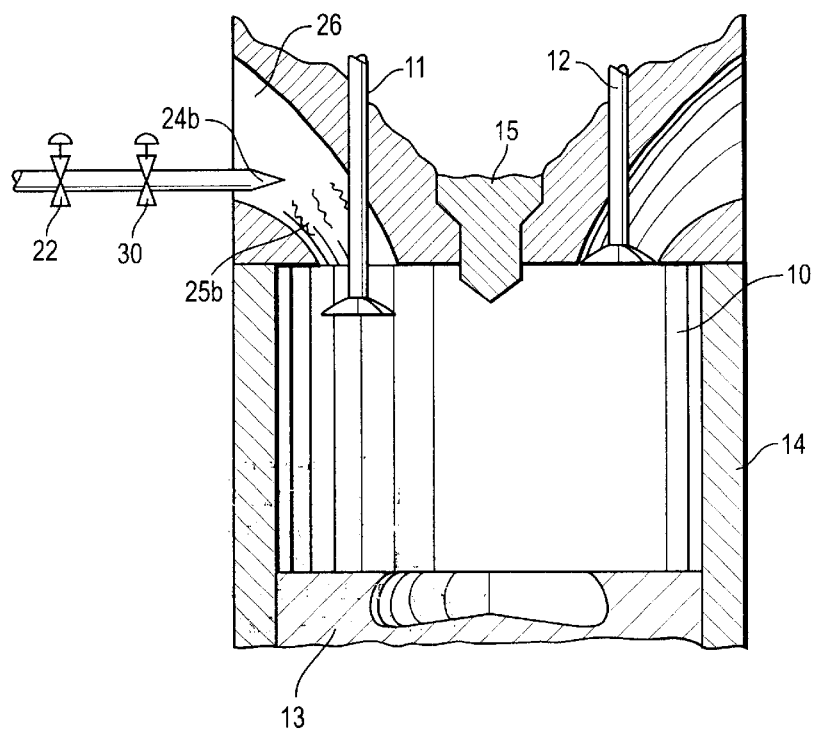
FIGS. 5a and 5b, depicts partial cross sectional views of an engine combustion chamber, showing the sequential events of provision or injection of fuel into the combustion chamber under a second set of high load conditions.
Figure 5B:
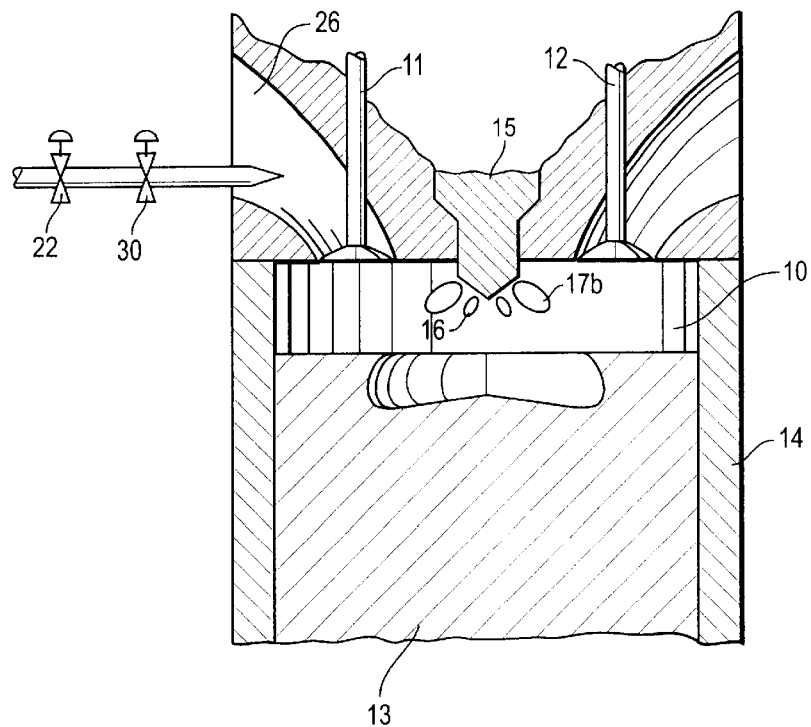

A second mode of two-stage gaseous fuel operation (with, in the mode described, pilot fuel) under high load conditions, as seen in FIGS. 5a and 5b, begins with injection of fumigated gaseous fuel 25b during the intake stroke as described above: see FIG. 4. Pilot fuel 16c is injected near top dead center followed by gaseous fuel 17c directly injected into the combustion chamber near top dead center. This gaseous fuel injection commences during or shortly after the injection of pilot fuel 16c. Again, the fumigated gaseous fuel equivalence ratio is preferably maximized without exceeding the knock limit at the load conditions in question assuming those load conditions exceed that which can be met by a knock limited fumigated fuel. Remaining power requirements are accommodated by the resulting diffusion combustion of gaseous fuel 17c, which is directly injected.

Figure 6A:
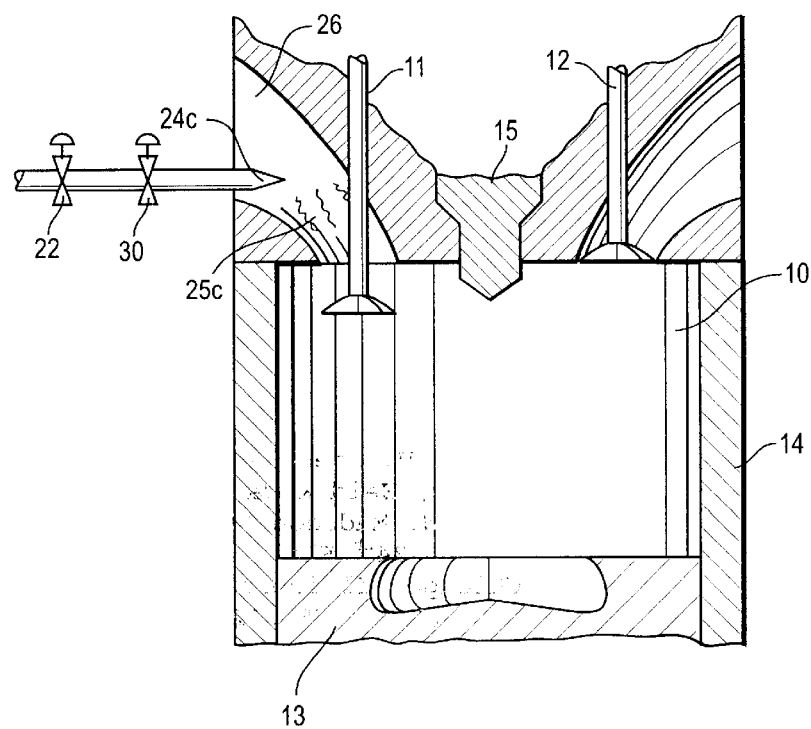
FIGS. 6a, 6b and 6c, depicts partial cross sectional views of an engine combustion chamber, showing the sequential events of provision or injection of fuel into the combustion chamber under a third set of high load conditions.
Figure 6B:
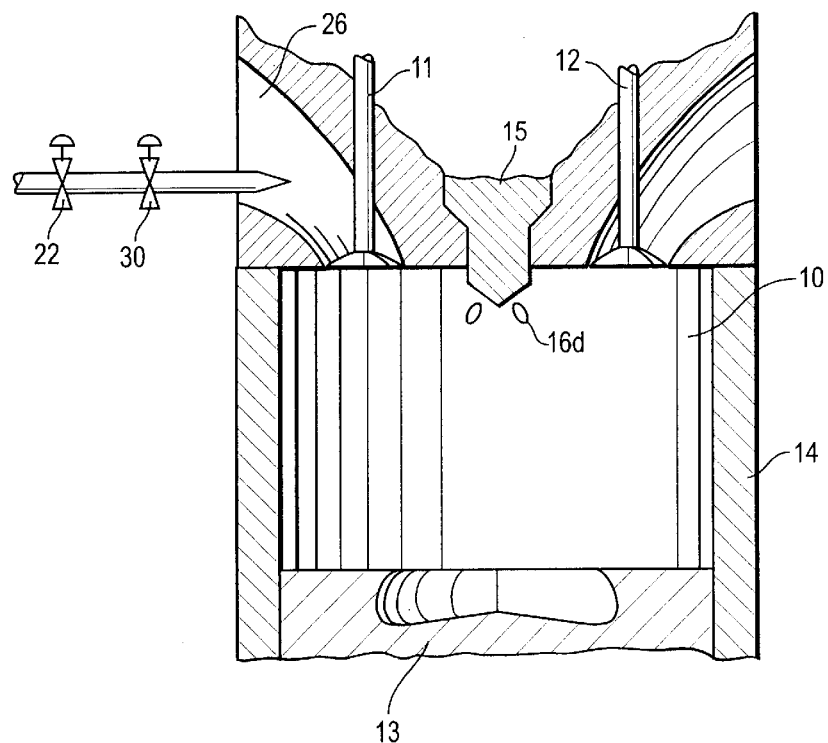
Figure 6C:
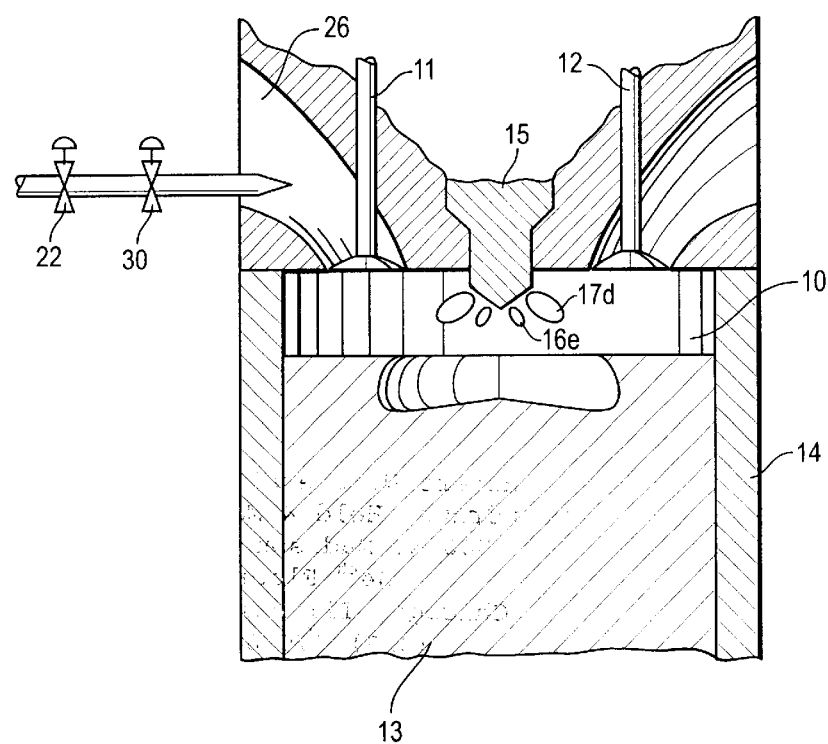

Referring to FIGS. 6a, 6b and 6c, an additional embodiment is shown for operating under high load conditions. This method varies from those disclosed above in so far as the injection of pilot fuel is split. Referring to FIG. 6b, early injection pilot fuel 16d is introduced preferably at or near the commencement of the compression stroke. Referring to FIG. 6c, late injection pilot fuel 16e is then introduced when the piston is near top dead center. This allows more control over start of combustion as the required amount of pilot fuel is introduced just prior to the desire start of combustion when the piston is near top dead center. However, it allows a quantity of pilot fuel to also mix with intake air or oxygen resulting in a cleaner burn of the pilot fuel overall. In this embodiment, injection of fumigated fuel 25c (FIG. 6a) and directly injected fuel 17d (FIG. 6c) corresponds to the embodiment depicted in FIGS. 4 and 5 for high load operation.

Note that there are other ways of operating with the same general high-load multi-event gaseous fuel introduction arrangement noted above. These include the introduction of gaseous fuel directly injected into the cylinder under high pressure conditions during the intake stroke or early in the compression stroke. While this arrangement does introduce a gaseous fuel that will be mixed with the intake air drawn in during the intake stroke, thus delivering a fumigated gaseous fuel by the time the power stroke is ready of operating technique. The gaseous fuel injected directly during the intake stroke or early in the compression stroke is injected at pressure. That is, such a fumigated fuel will first pass through the compressor consuming energy to compress this gas prior to injection. No real advantage is realized by injecting this gaseous fuel under pressure at this point in the engine cycle. The energy required to compress the gaseous fuel in the compressor is wasted, as no significant benefit is derived.

Referring to the operating arrangement set out above, the entire cycle, utilizing a pilot fuel, preferably operates in the following manner. During low speed low load, the engine is powered utilizing combustion of pilot fuel 16 and gaseous fuel 17 each of which is injected when piston 13 is near top dead center. Both fuel quantities are directly injected under pressure. Shortly after stable low load operation has been achieved after start-up or where the engine load is negligible and running for an extended period under idle conditions, by way of example see region P of FIG. 1, the engine operating mode is moved into a high speed low load operating mode L by opening shut-off valve 22 and introducing gaseous fuel 24 into intake manifold 26 via variable control valve 30 which is initially set to provide a low equivalence ratio fumigated fuel 25 that exceeds the fumigated fuel that would result from the minimum flow rate established by the control valve leakage flow rate. Once the operator requires the engine to meet higher load demands beyond the premixed combustion stability limit, by way of example above Line C into region H of FIG. 1, pilot fuel 16b is introduced directly into the cylinder earlier in the cycle compression stroke or in the intake stroke. Care is taken to ensure that the quantity of pilot fuel ignites when required, that is, when the piston is near top dead center. Further, fumigated gaseous fuel 25a is, in general, delivered such that it will not result in excessive knock. Additional power beyond what can be provided by the knock limited fumigated fuel, as load requirements dictate, are met by direct injection of gaseous fuel 17b introduced near top dead center helping to drive the power stroke. While it is conceivable that high load operating modes exist that can be powered solely by combustion of fumigated gaseous fuel 25a ignited by pilot fuel 16b, thereby foregoing directly injected gaseous fuel and, therefore, diffusion combustion, it is desirable with many injector designs to maintain some amount of directly injected gaseous fuel 17b to avoid overheating of the injector tip. Heating can be managed with the flow of pilot fuel as well, however, emissions penalties result in higher quantities of pilot fuel.

Note that while the introduction of extremely lean fumigated fuel 25 into cylinder 13 during low load operation L is driven initially by the desire to provide a controlled leakage flow into the cylinder, this mode of operation is beneficial in the low load operating mode at equivalence ratios above the leakage rate of the variable control valve. In this arrangement, the focus is on the amount of fuel introduced into the cylinder in the fumigation stage and whether that results in the introduction of a second combustion event during the power stroke beyond diffusion combustion created by high pressure direct injection gaseous fuel 17a alone. There is a desire to move in this operational mode from high pressure direct injection gaseous fuel 17a to fumigating after stable low speed low load and high speed low load has been secured. Therefore, one advantage of fumigating under low load conditions is that it introduces an operating mode with a controlled amount of fumigation that does provide only nominal power to the engine. The system is then prepared for transition to the dual burn lower emission high load operation while still allowing low speed low load under high pressure direct injection 17 alone. Likewise, there is also a way to move back into an idle mode under diffusion combustion alone in preparation for further load requirements as required by an operator.

As noted above, there are other operational strategies as is apparent to persons skilled in the technology involved here. However, the method disclosed represents the preferred method to:

(a) meet the load requirements of an engine across a broad range of operational demands;
(b) minimize emissions, most significantly, NOx and particulate emissions; and,
(c) provide modes of operating that facilitate transition from low speed low load through high speed low load and to high load operation beyond the premixed combustion stability limit.

For engines that comprise a plurality of pistons, a plurality of auxiliary injectors can be employed.

Figure 7:
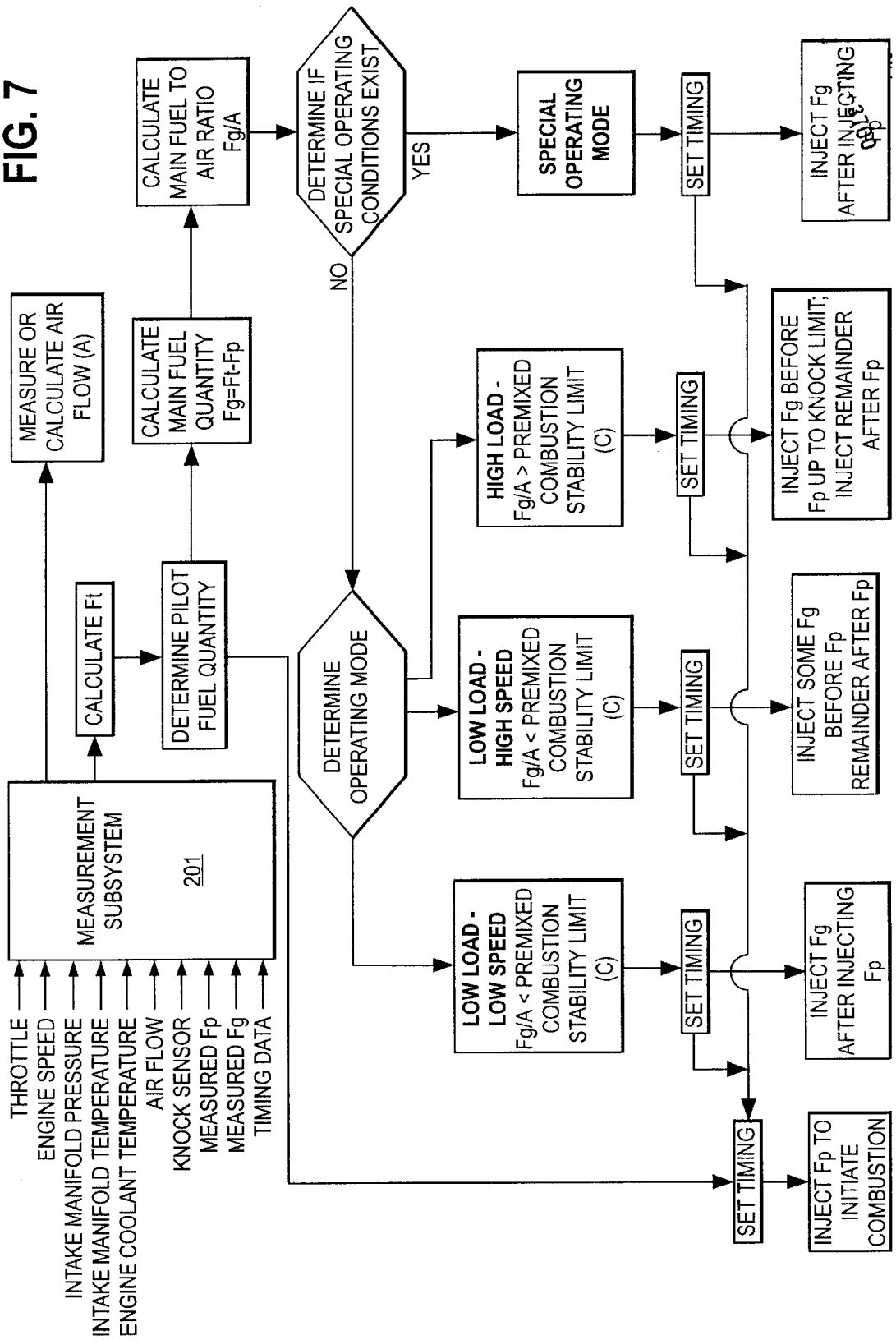
FIG. 7 is a control logic diagram that provides an example of the logic that might be employed by an electronic control unit to implement the fuel injection timing under the pre-defined set of operating parameters. In this embodiment of the method, the fuel to air ratio, which correlates to engine load, is determined and employed to select the desired operating mode.

In a preferred embodiment, the proportion of gaseous fuel 24, 24a, 24b, 24c and directly injected gaseous fuel 17, 17a, 17b, 17c, 17d (as the case may be) to pilot fuel 16, 16a, 16b, 16c, 16d and 16e and the timing for introducing fuel into combustion chamber 13 is determined by an electronic control unit (ECU). FIG. 7 is a control logic diagram that depicts the logic that such an ECU can be programmed to follow.

With reference to FIG. 7, a measurement subsystem 201 can be employed to collect data relating to current operating conditions. In a preferred embodiment, measurement subsystem 201 collects data relating to the throttle position and the engine speed. Measurement subsystem 201 can optionally provide additional data, such as intake manifold charge temperature, engine coolant temperature, intake manifold charge pressure, air flow, information that indicates the occurrence of excessive knocking and information that indicates the start of combustion.

For example, the ECU preferably receives data indicating the measured throttle position and employs this data to calculate, on an energy basis, the total amount of fuel (Ft) required to satisfy the current engine load. The ECU then determines the desired quantity of pilot fuel (Fp), which can be obtained, for example, from a look-up table that has been calibrated for the engine. The quantity of gaseous fuel (Fg) is then easily calculated (that is, Fg=Ft−Fp).

Meanwhile, the ECU can also receive data from measurement subsystem 201 that indicates the current air flow (A), or data that the ECU can employ to calculate A. With Fg and A known, the ECU can calculate the gaseous fuel to air ratio (that is, Fg/A).

In the preferred embodiment, measurement subsystem 201 also sends data to the ECU indicating the current engine speed. Accordingly, with Fg/A and engine speed known, the ECU can determine the desired operating mode, by referring, for example, to a look-up table that stores information similar to that depicted in FIG. 1. In the preferred embodiment, a low load operating mode is selected if Fg/A is less than the premixed combustion stability limit (C), a high load operating mode is selected if Fg/A is greater than C. The ECU will also determine, based on engine speed at low speed low load, when the fuel shut-off valve is to be opened commencing low load fumigated gaseous fuel supply from purely high pressure direct injection gaseous and pilot fuel supply.

After the desired operating mode is selected, the timing is set for introducing the fuel into the combustion chamber. As described above, timing and the sequence of gaseous fuel (fumigated and directly injected) and pilot fuel injection depends upon the selected operating mode. In addition, the specific timing within an operating mode can also be dictated by engine speed and the quantity of fuel to be injected. Accordingly, after the ECU determines the desired operating mode, gaseous fuel and pilot fuel injection timing is set. Finally, the gaseous fuel and pilot fuel are injected into the combustion chamber at the appropriately set times.

In an embodiment where the measurement subsystem detects the occurrence of excessive knocking, the ECU can recalibrate its stored values to re-calibrate the value for knock limit K to prevent the re-occurrence of excessive knocking. That is, if excessive knocking is detected during a high load operating mode, the ECU can re-calibrate itself to reduce the quantity of fumigated gaseous fuel ($F_{fg}$).

The ECU can also recalibrate the premixed combustion stability limit to compensate for changes in intake manifold pressure and temperature. Alternatively, the intake manifold temperature and pressure can be monitored and adjusted to maintain substantially constant values for predetermined operating conditions.

As used herein, the term "throttle" or "throttle position" has been used in a general sense to convey the load request on the engine. Typically, such a load request is set by the user and can be a foot pedal placement (in the case of a vehicular engine) or a predetermined load request (in the case of a stationary energy generating engine). In general, there are many ways in which a user can set the load request and the term "throttle" should be understood in this general sense.

The above disclosure was derived for stationary power applications. The method and associated apparatus and controls are adaptable to vehicular applications. The main difference between the two applications is the fact that stationary applications tend to operate under constant load conditions for much longer periods than is the case for vehicular applications where there is typically more load variability. The method disclosed, however, does provide a way of stepping between different load conditions in either the stationary power application or the vehicular application. A vehicular application would simply move more frequently from region P through to region H via region L.

Further, although the present description is directed to four-stroke engines, persons skilled in the technology involved here will understand that the present fuel injection method can also be applied to other engine types such as, for example, two-stroke combustion engines.

While particular elements, embodiments and applications of the present method and apparatus have been shown and described herein, it will be understood, of course, that the invention is not limited thereto since modifications may be made by those skilled in the art, particularly in light of the foregoing teachings. It is therefore contemplated by the appended claims to cover such modifications as incorporate those features that come within the scope of the invention.

What is claimed is:

1. A method of introducing fuel into a combustion chamber of an internal combustion engine having at least one cylinder with a piston, said at least one cylinder and said piston partially defining said combustion chamber, said piston oscillating within said cylinder between top dead center and bottom dead center when said internal combustion engine is operating, said method comprising:
   (a) selecting either of a low load operating mode and a high load operating mode, said operating modes distinguished by combustion characteristics of a fumigated gaseous fuel within said combustion chamber, wherein:
     (1) said low load operating mode is defined where said fumigated gaseous fuel is unable to support stable premixed combustion,
     (2) said high load operating mode is defined where said fumigated gaseous fuel is able to support stable premixed combustion,
   (b) in said high load operating mode, introducing said fumigated gaseous fuel into said combustion chamber before said piston is at top dead center,
   (c) in said low load operating mode, if said fumigated gaseous fuel is provided, introducing said fumigated gaseous fuel into said combustion chamber before said piston is at top dead center,
   (d) in said low load operating mode, directly injecting a quantity of a second gaseous fuel into said combustion chamber when said piston is at or near top dead center,
   (e) igniting said fumigated gaseous fuel and said second gaseous fuel within said combustion chamber when said piston is at or near top dead center.

2. The method claimed in claim 1, further comprising, in said high load operating mode, directly injecting a quantity of said second gaseous fuel into said combustion chamber when said piston is at or near top dead center.

3. The method claimed in claim 2 wherein said second gaseous fuel is the same as the fuel in said fumigated gaseous fuel.

4. The method claimed in claim 3 wherein, in said high load operating mode, said fumigated gaseous fuel is ignited by way of homogeneous charge compression ignition.

5. The method claimed in claim 2 wherein ignition of said second gaseous fuel is as a result of ignition of a pilot fuel that is more auto-ignitable than said second gaseous fuel.

6. The method claimed in claim 2 wherein, in said high load operating mode, ignition of said fumigated gaseous fuel is as a result of ignition of a pilot fuel that is more auto-ignitable than said fumigated gaseous fuel.

7. The method claimed in claim 6 wherein said pilot fuel is directly injected into said combustion chamber.

8. The method claimed in claim 5 wherein, in said low load operating mode, said pilot fuel is directly injected into said combustion chamber when said piston is at or near top dead center.

9. The method claimed in claim 7 wherein, in said high load operating mode, said pilot fuel is directly injected into said combustion chamber during an intake stroke of said piston.

10. The method claimed in claim 7 wherein, in said high load operating mode, said pilot fuel is directly injected into said compression chamber during a compression stroke of said piston.

11. The method claimed in claim 10 wherein, in said high load operating mode, said pilot fuel is directly injected into said compression chamber when said piston is between 120 and 60 degrees prior to top dead center as measured in degrees of crankshaft rotation.

12. The method claimed in claim 7 wherein, in said high load operating mode, said pilot fuel is directly injected into said combustion chamber when said piston is at or near bottom dead center prior to or at the commencement of said compression stroke.

13. The method claimed in claim 7 wherein, in said high load operating mode, said pilot fuel is directly injected into said combustion chamber in a first stage during an intake stroke of said piston and in a second stage when said piston is at or near top dead center prior to or at the commencement of said power stroke.

14. The method claimed in claim 7 wherein, in said high load operating mode, said pilot fuel is directly injected into said combustion chamber in a first stage during a compression stroke of said piston and in a second stage when said piston is at or near top dead center prior to or at the commencement of said power stroke.

15. The method claimed in claim 14 wherein, in said high load operating mode, said pilot fuel is directly injected into said combustion chamber in said first stage when said piston is between 120 and 60 degrees prior to top dead center as measured in degrees of crankshaft rotation.

16. The method claimed in claim 7 wherein, in said high load operating mode, said pilot fuel is directly injected into said combustion chamber in a first stage when said piston is at or near bottom dead center prior to or at the commencement of said compression stroke and in a second stage when said piston is at or near top dead center prior to or at the commencement of said power stroke.

17. The method claimed in claim 2 wherein at least one of said fumigated gaseous fuel and said second gaseous fuel are ignited by way of a hot surface.

18. The method claimed in claim 17 wherein said hot surface is a glow plug.

19. The method claimed in claim 2 wherein at least one of said fumigated gaseous fuel and said second gaseous fuel are ignited by way of a spark.

20. The method claimed in claim 1, further comprising:
(f) in said low load operating mode, employing a low speed low load operating mode and a high speed low load operating mode, said low speed low load operating mode defined by an engine speed range, as measured in crankshaft revolutions per minute (RPM), from and including zero up to a pre-defined operating speed, said high speed low load operating mode defined by an engine speed at or above said pre-defined operating speed,
(g) in said low speed low load operating mode, barring the fuel in said fumigated gaseous fuel from said combustion chamber thereby eliminating fumigated fuel from said combustion chamber,
(h) in said high speed low load operating mode, introducing a flow of the fuel in said fumigated gaseous fuel that is in excess of a pre-defined leakage flow rate.

21. The method claimed in any one of claims 2 and 10, further comprising:
(f) in said low load operating mode, employing a low speed low load operating mode and a high speed low load operating mode, said low speed low load operating mode defined by an engine speed range, as measured in crankshaft revolutions per minute (RPM), from and including zero up to a pre-defined operating speed, said high speed low load operating mode defined by an engine speed at or above said pre-defined operating speed,
(g) in said low speed low load operating mode, barring the fuel in said fumigated gaseous fuel from said combustion chamber thereby eliminating fumigated fuel from said combustion chamber,
(h) in said high speed low load operating mode, introducing a flow of the fuel in said fumigated gaseous fuel that is in excess of a pre-defined leakage flow rate.

22. The method claimed in claim 21 wherein said flow of the fuel in said fumigated gaseous fuel is regulated by at least one of a shut-off valve and a variable control valve, each of which is disposed within a fuel passage defined by a fuel conduit, said fuel passage in communication with an intake passage defined by an intake conduit such that said fuel passage and said intake passage direct the fuel in said fumigated gaseous fuel into said combustion chamber during an intake stroke of said piston.

23. The method claimed in claim 22 wherein said shut-off valve is closed when said low speed low load operating mode is employed thereby prohibiting the fuel in said fumigated gaseous fuel from entering said combustion chamber.

24. The method claimed in claim 22 wherein the fuel in said fumigated gaseous fuel is substantially mixed with oxygen in said intake passage.

25. The method claimed in claim 21 wherein, if said fumigated fuel is provided to said combustion chamber, the fuel in said fumigated gaseous fuel is injected into an intake passage defined by an intake conduit, said intake passage directing the fuel in said fumigated gaseous fuel into said combustion chamber during an intake stroke of said piston.

26. The method claimed in claim 21 wherein, if said fumigated fuel is introduced to said combustion chamber, the fuel in said fumigated gaseous fuel is directly injected into said combustion chamber.

27. The method claimed in claim 2 wherein the fuel in said fumigated gaseous fuel is substantially mixed with oxygen in said combustion chamber.

28. The method claimed in any one of claims 2 and 10 wherein said fumigated gaseous fuel is at or below a pre-defined knock limit when said high load operating mode is employed.

29. The method claimed in claim 28 wherein, in said high load operating mode, said quantity of said second gaseous fuel is zero when combustion of said fumigated gaseous fuel meets engine load requirements.

30. The method claimed in claim 28 wherein, in said high load operating mode, said quantity of said second gaseous fuel is at or above a pre-defined injector tip maintenance limit.

31. The method claimed in claim 28 wherein, in said high load operating mode, said quantity of said second gaseous fuel is determined by engine load requirements beyond that met by combustion of said fumigated gaseous fuel.

32. The method claimed in claim 30 wherein, in said high load operating mode, said quantity of said second gaseous fuel is determined by engine load requirements beyond that met by combustion of said fumigated gaseous fuel and at or above said pre-defined injector tip maintenance limit.

33. The method claimed in claims 21 wherein, in said high load operating mode, said fumigated gaseous fuel is at or below a pre-defined knock limit.

34. The method claimed in claim 33 wherein, in said high load operating mode, said quantity of said second gaseous fuel is zero when combustion of said fumigated gaseous fuel meets engine load requirements.

35. The method claimed in claim 33 wherein, in said high load operating mode, said quantity of said second gaseous fuel is at or above a predefined injector tip maintenance limit.

36. The method claimed in claim 33 wherein, in said high load operating mode, said quantity of said second gaseous fuel is determined by engine load requirements beyond that met by combustion of said fumigated gaseous fuel.

37. The method claimed in claim 35 wherein, in said high load operating mode, said quantity of said second gaseous fuel is determined by engine load requirements beyond that met by combustion of said fumigated gaseous fuel and at or above said pre-defined injector tip maintenance limit.

38. An apparatus for introducing fuel into a combustion chamber of an internal combustion engine having at least one cylinder with a piston, said cylinder and said piston partially defining said combustion chamber, said piston oscillating between top dead center and bottom dead center within said cylinder when said internal combustion engine is operating, said apparatus comprising:
(a) measuring devices for collecting operational data from said engine, said data including engine speed, engine load demand and excessive knock information,
(b) a controller, capable of
  (1) processing said operational data to create an engine profile, and,
  (2) directing said engine to operate in one of a low load operating mode and a high load operating mode based on said engine profile, wherein said low load operating mode and said high load operating mode are distinguished by combustion characteristics of a fumigated gaseous fuel within said combustion chamber, wherein said low load operating mode is defined where said fumigated gaseous fuel is unable to support stable premixed combustion, said high load operating mode is defined where said fumigated gaseous fuel is able to support stable premixed combustion,
(c) a main fuel injector capable of directly injecting a second gaseous fuel into said combustion chamber, (d) a pilot fuel injector capable of injecting a pilot fuel into said combustion chamber, said pilot fuel being more auto-ignitable than said fumigated gaseous fuel or said second gaseous fuel, (e) an intake conduit for directing said fumigated gaseous fuel into said combustion chamber, wherein:
in said low load operating mode, said control unit directs,
if said fumigated gaseous fuel is provided, said fumigated gaseous fuel through said intake conduit to be available within said combustion chamber before said piston is at top dead center,
said main fuel injector to introduce said second gaseous fuel into said combustion chamber when said piston is at or near top dead center, and,
said pilot fuel injector to introduce said pilot fuel into said combustion chamber when said piston is at or near top dead center,
in said high load operating mode, said control unit directs,
said fumigated gaseous fuel through said intake conduit to be available in said combustion chamber when said piston is at or near top dead center, said fumigated gaseous fuel falling below a pre-defined knock limit,
said pilot fuel injector to introduce said pilot fuel into said combustion chamber during the compression stoke of said engine when operating.

39. The apparatus claimed in claim 38 wherein, in said high load operating mode, said control unit further directs said main fuel injector to introduce said second gaseous fuel into said combustion chamber when said piston is at or near top dead center.

40. The apparatus claimed in claim 38 wherein, in said high load operating mode, said control unit directs said main fuel injector to meet said engine load demand beyond that provided by combustion of said fumigated fuel by causing said second gaseous fuel to be injected into said combustion chamber when said piston is at or near top dead center.

41. The apparatus claimed in claim 40 wherein, in said high load operating mode, said control unit directs said main fuel injector to introduce said second gaseous fuel in a quantity no less than a pre-defined injector tip maintenance limit.

42. The apparatus claimed in any one of claims 38 and 41 wherein, in said low load operating mode, said control unit is further capable of directing said engine to operate in either a low speed low load operating mode or a high speed low load operating mode based on said engine profile, said low load operating modes distinguished by engine speed as measured in crankshaft revolutions per minute (RPM) wherein:

(f) said low speed low load operating mode is defined by an engine speed range from and including zero up to a pre-defined operating speed, (g) said high speed low load operating mode is defined by an engine speed range at or above said pre-defined operating speed,
in said low speed low load operating mode, said control unit prohibits said fumigated gaseous fuel from said combustion chamber,
in said high speed low load operating mode, said control unit directs the fuel in said fumigated gaseous fuel through to said intake conduit in a quantity in excess of a pre-defined leakage flow rate.

43. The apparatus claimed in claim 42 further comprising a fuel conduit in communication with said intake conduit, said fuel conduit comprising a fuel shut-off valve and a variable control valve each of which is for controlling the amount of the fuel in said fumigated gaseous fuel.

44. A method of introducing fuel into a combustion chamber of an operating internal combustion engine having at least one cylinder with a piston, said engine having a low load mode of operation and a high load mode of operation, and wherein said fuel comprises a main fuel and a pilot fuel that is more auto-ignitable than said main fuel, said method comprising:

(a) detecting a set of load conditions on said engine; and (b) employing said low load operating mode when a first predetermined set of load conditions is detected, said first predetermined set of load conditions corresponding to load conditions that exist when the desired ratio of said main fuel to air is less than a calibrated premixed combustion stability limit of a homogeneous mixture of said main fuel and intake air, and employing said high load operating mode when a second predetermined set of load conditions is detected, wherein at an operating engine speed as measured in the form of crankshaft revolutions per minute, said second set of load conditions corresponds to an engine load that is greater than the engine load corresponding to said first predetermined set of load conditions.

* * * * *